(12) United States Patent
Porter et al.

(10) Patent No.: US 7,772,726 B1
(45) Date of Patent: Aug. 10, 2010

(54) IRRIGATION CONTROLLER WITH PROCESSOR POWER DOWN UPON MODULE UNLOCKING

(75) Inventors: LaMonte D Porter, San Marcos, CA (US); Peter J Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 114 days.

(21) Appl. No.: 12/251,666

(22) Filed: Oct. 15, 2008

Related U.S. Application Data

(63) Continuation of application No. 11/853,322, filed on Sep. 11, 2007, now abandoned.

(51) Int. Cl.
*F16P 3/20* (2006.01)
*H02H 11/00* (2006.01)
*G05D 7/00* (2006.01)
(52) U.S. Cl. .................. 307/328; 307/326; 700/284
(58) Field of Classification Search ............. 307/326, 307/328; 700/284
See application file for complete search history.

(56) References Cited

U.S. PATENT DOCUMENTS

| | | | |
|---|---|---|---|
| 6,842,667 B2 * | 1/2005 | Beutler et al. | 700/284 |
| 6,996,457 B2 | 2/2006 | Williams et al. | 700/284 |
| 7,225,058 B1 | 5/2007 | Porter | 700/284 |
| 7,243,005 B1 * | 7/2007 | Beutler et al. | 700/284 |
| 7,457,687 B1 * | 11/2008 | Porter | 700/284 |
| 2005/0038529 A1 | 2/2005 | Perez et al. | 700/19 |
| 2005/0267641 A1 | 12/2005 | Nickerson et al. | 700/284 |
| 2005/0273205 A1 | 12/2005 | Nickerson et al. | 700/284 |

* cited by examiner

*Primary Examiner*—Albert W Paladini
*Assistant Examiner*—Hal I Kaplan
(74) *Attorney, Agent, or Firm*—Michael H. Jester

(57) ABSTRACT

A modular irrigation controller includes a processor for executing a watering program and turning a plurality of irrigation valves ON and OFF in accordance with the watering program. The irrigation controller includes a plurality of receptacles for each receiving a station module including a station module circuit connectable to a corresponding one of the irrigation valves. A manually actuable mechanism locks the station module in the corresponding receptacle and applies power to the processor when the station module is locked.

23 Claims, 4 Drawing Sheets

IRRIGATION CONTROLLER WITH PROCESSOR POWER DOWN UPON MODULE UNLOCKING

CROSS-REFERENCE TO RELATED APPLICATION

This application is a continuation of, and claims priority from, the similarly entitled co-pending U.S. patent application Ser. No. 11/853,322 filed Sep. 11, 2007 naming the same co-inventors.

FIELD OF THE INVENTION

The present invention relates to electronic irrigation controllers that control valves which supply water to sprinklers, and more particularly, to modular irrigation controllers that can be expanded after initial installation to control more zones or stations.

BACKGROUND

Residential and commercial irrigation systems for turf and landscaping typically include one or more solenoid operated valves that are turned ON and OFF by an electronic irrigation controller. The valves admit water to various branch lines in the form of subterranean PVC pipes that each supply several sprinklers connected at spaced intervals. Each combination of a solenoid valve and its associated sprinklers is referred to in the irrigation industry as a zone or station. A modern electronic irrigation controller typically includes a microprocessor that executes one or more stored watering programs. These watering programs are typically programmed or selected by the user via push button and/or rotary knob. The irrigation controller usually has an LCD or other display to facilitate programming by the user. The microprocessor controls the solenoid valves via suitable drivers and switching devices. The valves are opened and closed by the microprocessor in accordance with the programmed run and cycle times for each of the stations.

Modular expandable irrigation controllers have gained increasing popularity in both residential and commercial landscape applications. In a modular irrigation controller, the base portion of the irrigation controller contains the microprocessor and user actuated manual controls. Each station is then controlled by a corresponding station module which comprises a plastic housing that encloses and supports a station module circuit, as well as wire connection terminals for connecting wires that lead to a plurality of solenoid actuated irrigation valves. Typically each station module can independently control more than one solenoid actuated valve. The station modules contain pins, sockets, card edge connectors or some other standard form of electro-mechanical connectors for allowing them to be connected and disconnected from the base portion of the irrigation controller. The station modules are typically inserted into receptacles in either the housing that contains the microprocessor or a separate back panel hinged to the microprocessor housing. A modular irrigation controller is typically connected to each solenoid actuated valve by a dedicated field valve line, for example, twelve gauge wire. A common return line is connected between all of the valves and the irrigation controller. Triacs in the station module circuit are typically used to switch a twenty-four volt AC signal ON and OFF relative to each of the field valve lines.

The principal advantage of this modular configuration is that the base portion of the irrigation controller need only be equipped with the minimum number of station modules that can control the total number of stations required to irrigate the turf and/or landscaping of a particular system installation. Thus, for example, an irrigation system may have only three zones, requiring only a single station module, while another may have twelve zones that might require four station modules. Considerable cost savings are thus achieved. Moreover, if an irrigation system expands after initial installation because the landscaping has increased, additional station modules can be added. Furthermore, if a station module is damaged by a lightening strike, or otherwise fails, it can be readily replaced.

One drawback of conventional modular irrigation controllers is that the user typically connects the field valve lines to the station modules when the AC power to the modules is "live," presenting a shock hazard. If an indoor mounted controller is first disconnected from the AC wall outlet, there is a risk that the watering programs stored in the controller will be lost. Outdoor mounted controllers are usually hard-wired to an AC power source. To reduce the risk of an electric shock, the user must first locate and turn off a circuit breaker, typically at a remote and inconvenient location, before connecting or reconnecting field valve line wires. Again, there is a risk of losing the watering programs when the power is shut off to the irrigation controller in this fashion. This drawback has been overcome by constructing the modular irrigation controller such that only the communication path to the processor is established when the modules are plugged in, and thereafter, power is applied to the modules when they are locked in place. See U.S. Pat. No. 7,225,058 granted to La Monte D. Porter on May 29, 2007, assigned to Hunter Industries, Inc.

Yet another problem with conventional modular controllers is that power is constantly being provided to the microprocessor, which is often mounted in a removable face pack. Many times users would like to temporarily remove power to the face pack in order to perform various maintenance or service, such as replacement of a face pack where it is damaged or in order to upgrade the face pack. In conventional outdoor irrigation controllers the primary power is wired directly into the controller which is usually a sealed, highly flame-retardant enclosure. Removing the power to the face pack of such an irrigation controller requires the user to either open this enclosure and disconnect high voltage wiring from a transformer, or cut the secondary leads of the transformer.

SUMMARY

According to an embodiment of the present invention, a modular irrigation controller includes a processor for executing a watering program and turning a plurality of irrigation valves ON and OFF in accordance with the watering program. The irrigation controller includes a plurality of receptacles for each receiving a station module including a station module circuit connectable to a corresponding one of the irrigation valves. A manually actuable mechanism locks the station module in the corresponding receptacle and applies power to the processor when the station module is locked.

BRIEF DESCRIPTION OF THE DRAWINGS

Throughout the drawing figures like reference numerals refer to like parts.

DETAILED DESCRIPTION

The entire disclosures of the following commonly assigned U.S. patents and applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH- DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; pending U.S. patent application Ser. No. 10/883,283 filed Jun. 30, 2004 also of Peter J. Woytowitz entitled HYBRID MODULAR/DECODER IRRIGATION CONTROLLER; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; U.S. Pat. No. 7,245,991 granted Jul. 17, 2007 also of Peter J. Woytowitz entitled DISTRIBUTED ARCHITECTURE IRRIGATION CONTROLLER; pending U.S. patent application Ser. No. 11/191,858 filed Jul. 28, 2005 also of Peter J. Woytowitz entitled MODULAR IRRIGATION CONTROLLER WITH SEPARATE FIELD VALVE LINE WIRING TERMINALS; U.S. Pat. No. 7,243,005 granted Jul. 10, 2007 of Matthew G. Beutler et al. entitled MODULAR IRRIGATION CONTROLLER; pending U.S. patent application Ser. No. 11/288,831 filed Nov. 29, 2005 of LaMonte D. Porter et al. entitled EVAPOTRANSPIRATION UNIT FOR RE-PROGRAMMING AN IRRIGATION CONTROLLER; U.S. Pat. No. 7,225,058 granted May 29, 2007 of La Monte D. Porter entitled MODULAR IRRIGATION CONTROLLER WITH INDIRECTLY POWERED STATION MODULES; and pending U.S. patent application Ser. No. 11/748,356 filed May 14, 2007 of LaMonte D. Porter entitled IRRIGATION CONTROLLER WITH INDIRECTLY POWERED STATION MODULES.

Figure 1:
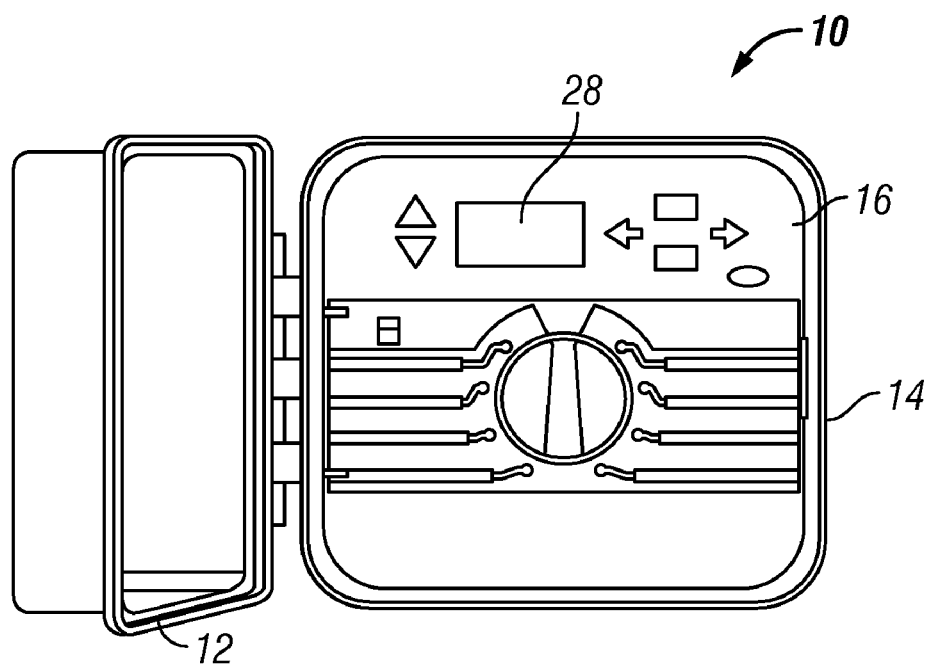
FIG. 1 illustrates an embodiment of the irrigation controller of the present invention with its front door open to reveal its removable face pack.
Figure 2:
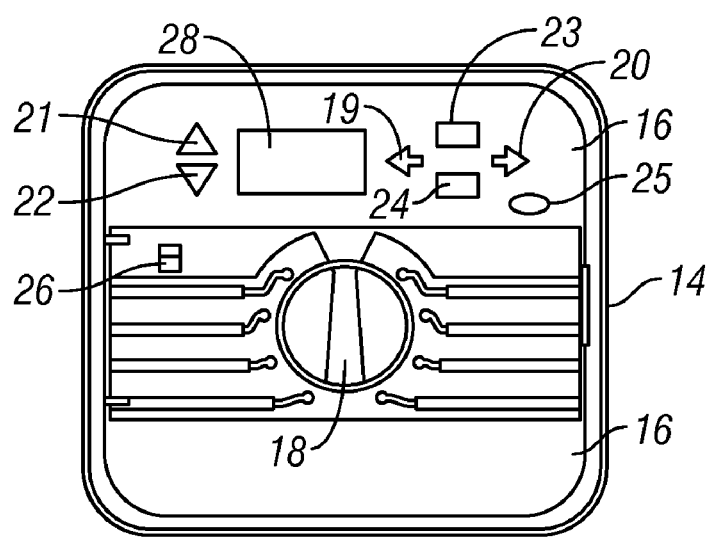
FIG. 2 is a plan view of the removable face pack and back panel of the irrigation controller of FIG. 1.
Figure 5:
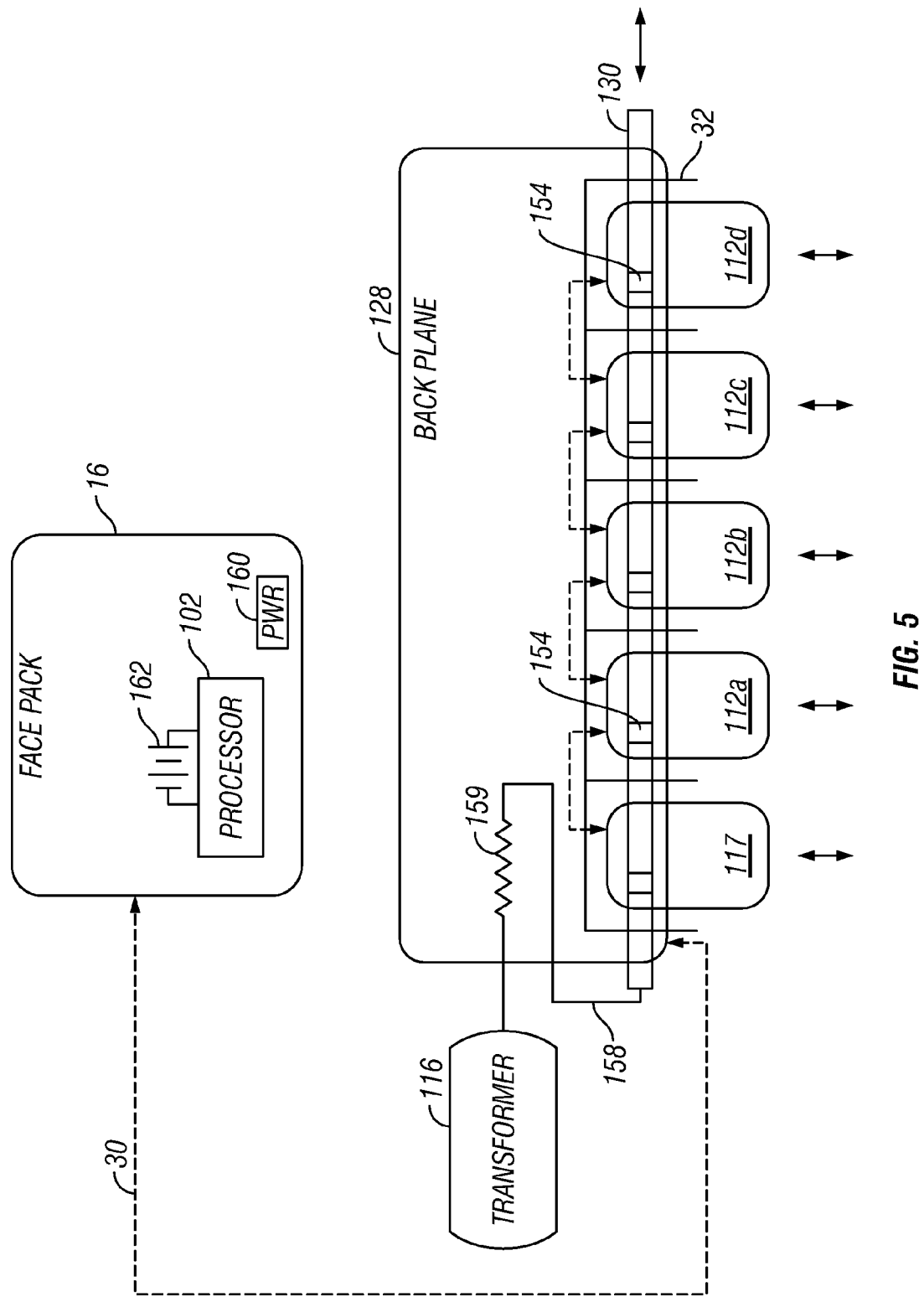
FIG. 5 is a diagrammatic illustration of the simultaneous module and face pack power up accomplished by the module locking mechanism of the irrigation controller of FIG. 1.

Referring to FIGS. 1 and 2, an irrigation controller 10 in accordance with an embodiment of the present invention includes a wall-mountable plastic housing structure in the form of a generally box-shaped front door 12 hinged along one vertical edge to a generally box-shaped back panel 14. A generally rectangular face pack 16 (FIG. 2) is removably mounted over the back panel 14 and is normally concealed by the front door 12 when not being accessed for programming. The face pack 16 has a plurality of manually actuable controls including a rotary knob switch 18 and push button switches 19, 20, 21 22, 23, 24 and 25 as well as slide switch 26. These manual controls can be manipulated in conjunction with numbers, words and/or graphic symbols indicated on a liquid crystal display (LCD) 28 for entering or selecting a watering program as is well known in the art of electronic irrigation controllers. Custom watering programs can be created by the user by manipulating the rotary knob switch 18 and selected ones of the push button switches 19, 20, 21 22, 23, 24 and 25. The custom watering program can be a complex set of run time and cycle programs, or a portion thereof, such as a simple five minute cycle for a single station. Alternatively, existing pre-programmed watering programs can be selected, such as watering all zones every other day for five minutes per zone. The face pack 16 (FIGS. 1 and 2) supports a circuit board assembly (not illustrated in FIGS. 1 and 2) with a processor for executing and implementing a stored watering program. An electrical connection is made between the face pack 16 and the components in the back panel 14 through a ribbon cable 30 (FIG. 5).

Figure 3:
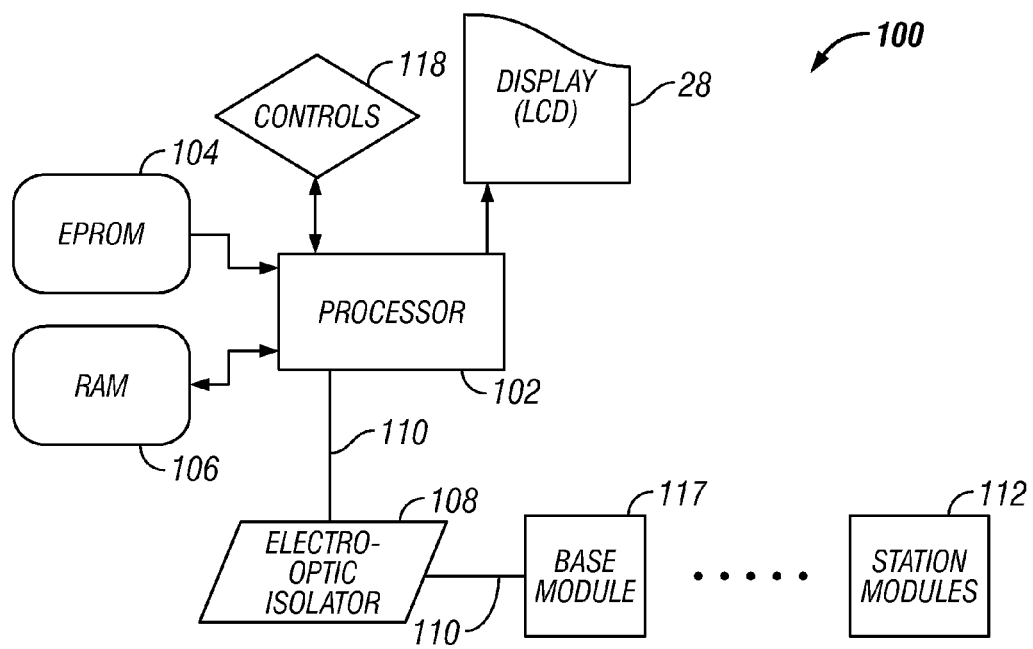
FIG. 3 is a simplified block diagram of the electronic portion of the irrigation controller of FIG. 1.

FIG. 3 is a simplified block diagram of the electronic portion 100 of the irrigation controller 10. A processor 102 is mounted on a printed circuit board inside the face pack 16. The processor 102 executes a selected watering program stored in a program memory in the form of ROM 104 using a data memory in the form of RAM 106. The processor 102 may comprise a micro-controller that uses separate memory, or a micro-computer with on-chip memory that serves the same functions as the ROM 104 and RAM 106. By way of example, the processor 102 may be a PIC24FJ64GA004 micro-controller commercially available from Microchip Technology. The manually actuable controls 118 and the LCD display 28 of the controller 10 are interfaced with the processor 102 in the usual fashion. By way of example, the processor 102 and driver for the LCD display 28 may be an integrated unit such as an S3F8289 component commercially available from Samsung. The processor 102 is connected through suitable input/output (I/O) devices (not illustrated), electro-optic isolator 108 and a bus 110 that is routed through the ribbon cable 30 to a plurality of station modules 112 and a base module 117. The station modules 112 and the base module 117 are removably mounted in receptacles 32 (FIG. 5) formed in the back panel 14. A transformer 116 located in the back panel 14 is connectable to a standard one hundred and ten volt AC source through a power cord (not illustrated) and supplies twenty-four volt AC electrical power to the base module 117 and to the station modules 112 as further described below.

The processor 102 (FIG. 3) controls the station modules 112 and the base module 117 in accordance with one or more watering programs. Serial or multiplexed communication is enabled over the bus 110 so that all of the information as to which stations or zones should be turned ON and OFF at any given time is present at each receptacle 32. The station modules 112 each include a station module circuit preferably including a micro-controller as well as multiple switching devices for switching the twenty-four volt AC signal ON and OFF to different solenoid actuated valves (not illustrated). The base module 117 also includes station module circuits for three zones, a pump/master volume output and surge suppression circuitry for these outputs. Suitable synchronous serial data and asynchronous serial data station module circuits are disclosed in the aforementioned U.S. Pat. No. 6,721,630. Typically the solenoid actuated valves are mounted in subterranean plastic boxes (not illustrated) relatively close to the controller 10. As used herein, the term "irrigation valve"

includes any type of remotely controlled valve useable in an irrigation system that may or may not employ a solenoid.

Figure 4:
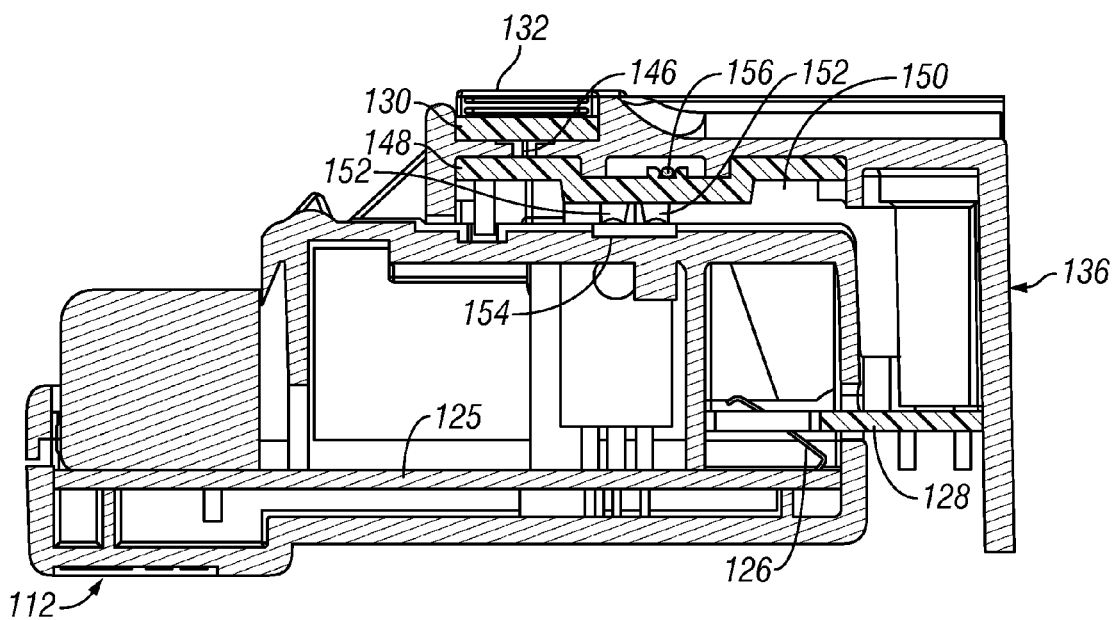
FIG. 4 is a fragmentary vertical cross-sectional view of the irrigation controller of FIGS. 1-3 illustrating structural details of its manually actuable module locking mechanism.

Referring to FIG. 4, a locking bar 130 can be manually slid between unlocked and locked positions to simultaneously secure and un-secure each station module 112 and the base module 117 in its corresponding receptacle 32 in the back panel 14. The station module circuit is supported on a small printed circuit board 125 inside the outer plastic housing of the station module 112. When the locking bar 130 is in its unlocked position, the station module 112 can be plugged into its receptacle 32. Flexible resilient metal contacts 126 on the small printed circuit board 125 mate with electrical contacts on a large printed circuit board 128 mounted inside the back panel 14 to provide a card edge connection system. The large printed circuit board 128 is also sometimes referred to as a back plane and it supports various circuit traces, connectors and components. A communication path is thus established between the station module circuit inside the module 112 and the processor 102 in the face pack 16 via the printed circuit board 128 and the ribbon cable 30. However, until the locking bar 130 is manually slid to its locked position by grasping raised projections 132, no power is supplied from the transformer 116 to the station module 112 (or any other modules that have been plugged in) or to the processor 102. The base module 117 can be similarly plugged into its corresponding receptacle 32 in the back panel 14 and locked in place by sliding the locking bar 130 to its locked position. This establishes a communication path between the station module circuits inside of the base module 117 and the processor 102.

Referring still to FIG. 4, the locking bar 130 is supported for lateral sliding motion in a track formed in the top of one leg of a generally L-shaped plastic support structure or housing 136. Vertical projections 146 extend through slots in the housing 136 and connect the locking bar 130 to a slide frame 148. The slide frame 148 is in turn supported for reciprocal sliding motion on the top of a generally rectangular lower housing 150. Pairs of metal spring finger-like contacts such as 152 extend from the underside of the slide frame 148 at laterally spaced intervals and can slide into, and out of, engagement with an electrical contact 154 on the top surface of each of the station modules 112 that are plugged into the back panel 14. The contact 154 is located on the top side of the station module 112 remote from the contacts 126 that engage the contacts that form card edge connectors on the large printed board 128. An elongate conductor 156 confined in a trough formed in a template supported by the slide frame 148 connects to each of the pairs of contacts 152 and is connected through a wire 158 (FIG. 5) to the transformer 116 through a current sensing resistor 159 for providing twenty-four volt AC power to each of the station modules 12. The base module 117 is also removably connected to the large printed circuit board 128 and receives power from a corresponding pair of finger-like contacts 152 and its own contact 154 in a similar fashion.

Referring still to FIG. 5, when the locking bar 130 is in its unlocked position, the base module 117 and the station modules 112 can be plugged into their corresponding receptacles 32. A daisy chain communication path indicated by dashed arrows is established between the far right station module 112d through edge connectors on the back plane 128, through the far left station module 112a, through the base module 117, and then through the ribbon cable 30 to the processor 102. Thus the communication between the station modules 112 and the processor 102 in the face pack 16 occurs indirectly through the base module 117. When the slide lock 130 is moved to its locked position mechanical interlocks are established between features on the locking bar 130 and the modules 112a-112d and 117 to hold them firmly in position and prevent them from being withdrawn from their receptacles 32. Further details of the module locking structure are disclosed in the aforementioned U.S. Pat. No. 7,225,058. At the same time, when the slide lock 130 is moved to its locked position, a twenty-four volt AC power signal from transformer 116 is supplied through wire 158, conductor 156 and contacts 152 and 154 to the station module circuits of the station modules 112. This same power signal is also supplied via the same locking mechanism to the base module 117 which then transmits the power signal through conductive traces on the back plane 128 through the ribbon cable 30 to power conditioning circuitry 160 in the face pack 16. The power conditioning circuitry 160 performs power conditioning to provide a clean five volt DC signal, for example to the micro-computer part of the processor 102. When the slide lock 130 is slid to its unlocked position the power signal is removed from the base module 117, the station modules 112a-112d, and the processor 102. Thus when the modules are locked in place, the processor 102 is powered up, but the processor 102 is also powered down when the modules are unlocked. A lithium battery 162 in the face pack 16 is connected to prevent loss of the watering programs stored in any volatile memory when the power from the transformer 116 is disconnected from the face pack 16. The face pack 16 can utilize a non-volatile memory chip in which case the battery 162 is only used for time keeping.

The irrigation controller 10 is different from, and superior to, prior modular irrigation controllers that only remove power to the station modules when they are unlocked. The irrigation controller 10 uses the module locking mechanism to also remove a power signal from the processor 102. As used herein, the term "power signal" refers to a signal supplying electrical power on a continuing basis as opposed to an enable signal or some other signal indicating the presence or availability of power for operating the processor 102. This gives the user a way of removing power from the active components of the irrigation controller 10, all at once, in a manner that is transparent to the user. The user still needs to lock all the modules in place before leaving the installation site of the irrigation controller 10, and this locking action restores power to the modules 112a-112d and 117 and restores power to the processor 102. There is no secondary switch that can be left in the wrong position. From an electrical architecture point of view, this solution also results in a simpler, more reliable design. In known modular irrigation controllers that allow station modules to be installed at any point in time, unbeknownst to the rest of the hardware in the irrigation controller, arbitration algorithms must be utilized in order to recognize and in some cases activate the new hardware. By way of contrast, in the irrigation controller 10, all hardware is always existent at power up of the irrigation controller 10 and is detected as part of the normal initialization process of the system. This is much simpler than the constant querying and arbitration approach of the so-called "hot swappable" design exemplified in published U.S. Patent Application No. 2005/0273205 A1 of Nickerson et al.

Figure 6:
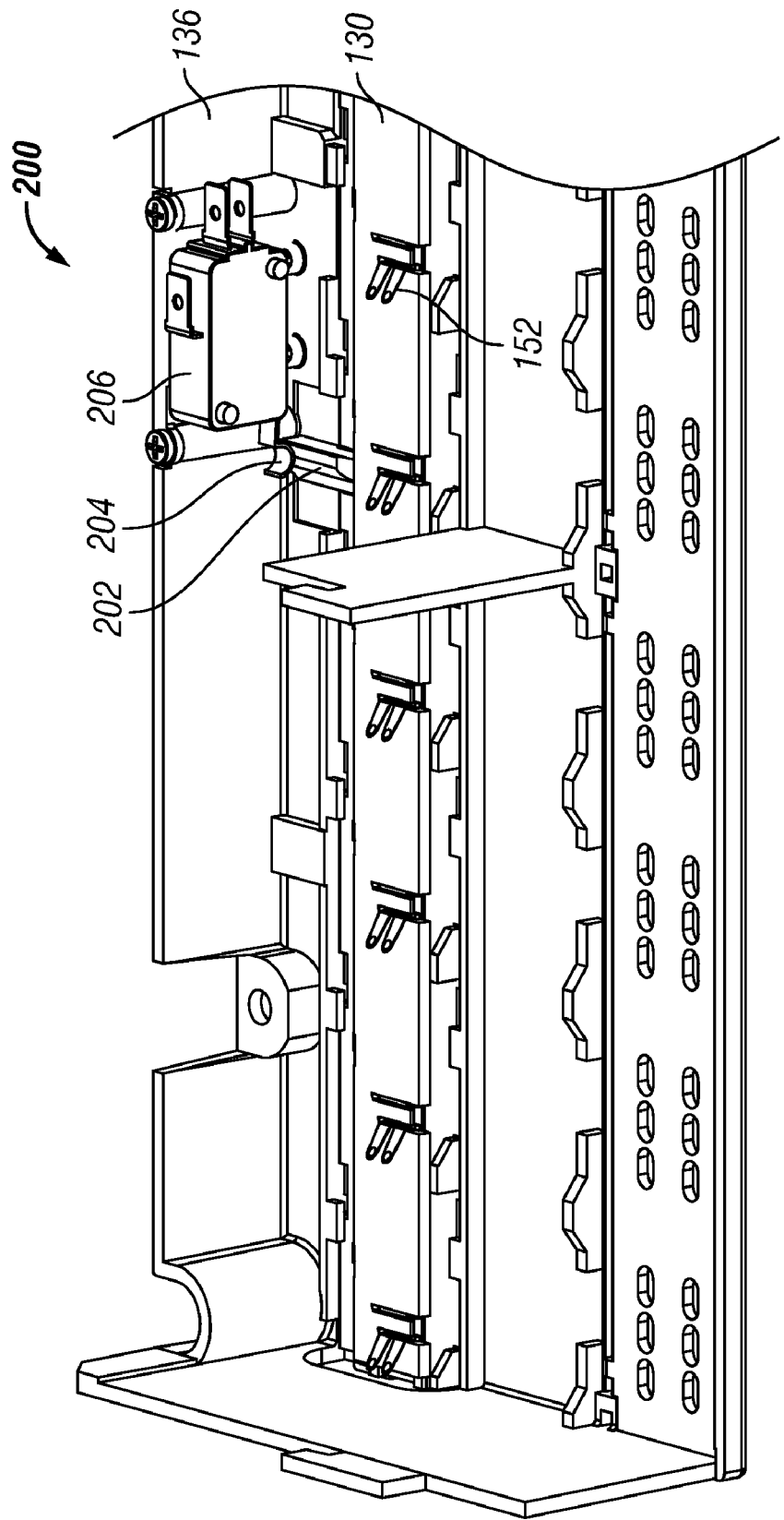
FIG. 6 is a fragmentary view of the underside of a locking mechanism of an alternate embodiment of the present invention.

FIG. 6 is a fragmentary view of the underside of a locking mechanism of an alternate embodiment 200 of the present invention. In the alternate embodiment 200, when the locking bar 130 is slid to its unlocked position a lateral projection 202 on the locking bar 130 trips the spring biased activation lever 204 of a micro-switch 206 mounted on the housing 136 to open the micro-switch 206 and disconnect power to the processor 102. When the locking bar 130 is slid to its locked position, the lateral projection 202 disengages the activation lever 204 and the micro-switch 206 closes, re-applying power to the processor 102. The station modules 112a-112d and the base module 117 otherwise function in the same manner in the alternate embodiment 200, as they do in the irrigation controller 10.

While we have described exemplary embodiments of a modular irrigation controller with station modules and a processor that can be simultaneously powered ON and OFF when locking and unlocking the modules with a manually actuable mechanism, it will be apparent to those skilled in the art that our invention can be modified in both arrangement and detail. For example, instead of a locking slide bar, a rotary mechanism can be used to simultaneously lock the modules and power up both the modules and the processor in the face pack. The locking and power up operations can be performed on a module-by-module basis. See the aforementioned U.S. Pat. No. 7,243,005. The communication path between the station module circuits and the processor could be established only by locking the station modules in place after they have been inserted. The circuitry and programming of the irrigation controller 10 can be widely varied. It can have a distributed architecture such as that disclosed in the aforementioned U.S. Pat. No. 7,245,991. Moreover, systems can be connected to the irrigation controller 10 for altering the watering programs to conserve water by taking stored and/or actual evapotranspiration (ET) data into account as disclosed in various patent applications incorporated by reference above. Therefore, the protection afforded our invention should only be limited in accordance with the following claims.

We claim:

1. A modular irrigation controller, comprising:
   a processor for executing a watering program and turning a plurality of irrigation valves ON and OFF in accordance with the watering program;
   a plurality of receptacles for each receiving a station module including a station module circuit connectable to a corresponding one of the irrigation valves; and
   a manually actuable mechanism that locks the station module in the corresponding receptacle and applies power to the processor when the station module is locked.

2. The controller of claim 1 wherein the manually actuable lock mechanism also applies power to the station module circuit when the station module is locked.

3. The controller of claim 1 wherein the station module has a first set of electrical contacts and the receptacles each have a second set of mating electrical contacts.

4. The controller of claim 1 wherein the manually actuable mechanism includes a sliding lock.

5. The controller of claim 1 wherein a communication path is established between the processor and a station module circuit of the station module when the station module is inserted into the corresponding receptacle and before power is applied to the processor.

6. The controller of claim 5 wherein the lock mechanism can be actuated to simultaneously lock each of the station modules in its corresponding receptacle, apply power to its station module circuit, and apply power to the processor.

7. The controller of claim 1 wherein the processor and station modules communicate through a backplane and power is applied to the station modules through a base module.

8. The controller of claim 1 wherein the lock mechanism opens and closes a switch to disconnect and connect power to the processor.

9. The controller of claim 1 wherein power is applied to the station modules through a base module.

10. A method of configuring a modular irrigation controller, comprising the steps of:
    inserting at least one station module into a receptacle of a modular irrigation controller to establish a communication path between a processor of the irrigation controller and a station module circuit inside the station module; and
    locking the station module in the receptacle with a manually actuable locking mechanism and applying power to the processor through the manually actuable locking mechanism.

11. The method of claim 10 wherein power is also simultaneously applied to the station module circuit when the station module is manually locked in the receptacle.

12. A modular irrigation controller, comprising:
    a processor for executing a watering program;
    a plurality of receptacles for each receiving a station module and establishing a communication path between the station module and the processor when the station module is inserted into a corresponding receptacle; and
    means for locking the station module in the corresponding receptacle after the station module has been inserted and simultaneously applying power to the processor after the communication path has been established.

13. The modular irrigation controller of claim 12 wherein the locking means also simultaneously applies power to the station module.

14. The modular irrigation controller of claim 12 wherein power is applied to the processor through the locking means.

15. The modular irrigation controller of claim 13 wherein power is applied to the processor and the station module through the locking means.

16. The modular irrigation controller of claim 12 wherein the processor is mounted in a removable face pack.

17. The modular irrigation controller of claim 12 wherein the locking means includes a sliding locking bar.

18. The modular irrigation controller of claim 12 wherein the receptacles include card edge connectors.

19. The modular irrigation controller of claim 13 wherein the communication path is established through a set of connectors on a first side of the station module and power is applied to the station module through a contact on a second side of the station module.

20. A modular irrigation controller, comprising:
    a processor for executing a watering program and turning a plurality of irrigation valves ON and OFF in accordance with the watering program;
    a plurality of receptacles for each receiving a station module including a station module circuit connectable to a corresponding one of the irrigation valves; and
    a manually actuable mechanism that locks the station module in the corresponding receptacle and disconnects power to the processor when the station module is unlocked.

21. The controller of claim 20 wherein the manually actuable lock mechanism also disconnects power from the station module circuit when the station module is unlocked.

22. The controller of claim 20 wherein the manually actuable mechanism includes a sliding lock.

23. The controller of claim 20 wherein the manually actuable lock mechanism can be actuated to simultaneously lock each of the station modules in its corresponding receptacle, apply power to its station module circuit, and apply power to the processor.

* * * * *